United States Patent Office

3,434,986
Patented Mar. 25, 1969

3,434,986
COATING COMPOSITIONS COMPRISING THE REACTION PRODUCT OF A DRYING OR SEMIDRYING OIL WITH VINYL BENZYL ALCOHOL
Earl C. Chapin, Springfield, Mass., assignor to Monsanto Company, St. Louis, Mo., a corporation of Delaware
No Drawing. Continuation-in-part of application Ser. No. 157,831, Dec. 7, 1961. This application June 2, 1966, Ser. No. 554,674
Int. Cl. C08f 19/00, 19/14
U.S. Cl. 260—21                    12 Claims

ABSTRACT OF THE DISCLOSURE

Disclosed herein is a process for preparing a reaction product of a drying oil or semidrying oil or mixture thereof with vinyl benzyl alcohol which comprises heating at from about 100 to 250° C. a mixture of 100 parts by weight of the oil and from about 5 to 300 parts by weight of the vinyl benzyl alcohol in the presence of up to 5% by weight, based upon the total weight of monomer and oil, of a base selected from the class consisting of alkali metal hydroxides and the oxides and hydroxides of alkaline earth metals and lead. The polymeric product obtained thereby and coating compositions containing such products are also claimed.

---

This application is a continuation-in-part of copending application Ser. No. 157,831, filed Dec. 7, 1961, now abandoned, and relates to novel coating compositions. More particularly, it relates to coating compositions resulting from the reaction of drying or semidrying oils with vinyl benzyl alcohol in the presence of a base.

One of the major disadvantages of drying and semidrying oils in paints and varnishes is their relatively slow drying time at ordinary temperatures even when compounded with metal driers. Substantial improvement is obtained by modifying the drying or semi-drying oils with styrene but the improvement is obtained at the expense of solvent and aging resistance and the dried films are soft and not scratch resistant. Moreover, such styrenated oils are only slightly compatible with melamine resins.

It is an object of this invention to provide novel coating compositions.

Another object is the provision of drying or semidrying oil based coating compositions having a fast drying rate, resistance to solvents and alkalies, compatability with melamine resins, and which produce hard scratch-resistant films.

These and other objects are attained by heating, drying or semidrying oils with vinyl benzyl alcohol in the presence of a base.

The following examples are given in illustration and are not intended as limitations on the scope of this invention. Where parts are mentioned, they are parts by weight. The vinyl benzyl alcohol used in the examples is an approximately 50/50 mixture of the meta- and para-isomers thereof.

EXAMPLE I

Mix together 25 parts of dehydrated castor oil, 25 parts of soyabean oil and 0.1 part of calcium hydroxide. Heat this mixture to about 200° C. and add thereto a solution of 1 part of ditertiarybutyl peroxide in 20 parts of vinyl benzyl alcohol, adding such solution dropwise over a period of about 100 minutes. Cool the resulting viscous reaction product to about room temperature, adjust to about 70% solids with xylol (ca. 35 parts) and filter to remove suspended calcium hydroxide. The resulting alkyd-like product is determined to contain about 4.0% hydroxyl groups by weight.

Cast a 0.002-inch film of this alkyd-like product on a clean coke steel tin plate and heat at 150° C. for 30 minutes. The resulting film is clear, tough and glossy, and does not crack on aging. The film is not attacked by xylol, ethanol, or 10% caustic solutions.

EXAMPLE II

Mix together 75 parts of soyabean oil and 0.2 part of calcium hydroxide. Heat this mixture to about 180° C. and add thereto a solution consisting of mixture of 25 parts of vinyl benzyl alcohol, 25 parts of styrene and 4 parts of ditertiarybutyl peroxide, adding such solution dropwise over a period of about 6 hours. Cool the resulting viscous reaction product to about room temperature, adjust to about 50% solids with 1:1 by weight mixture of xylene and butanol (ca. 125 parts) and filter to remove suspended calcium hydroxide. The resulting alkyd-like product is determined to contain about 2.5% hydroxyl groups by weight.

EXAMPLE III

Example I is repeated substituting sodium hydroxide for the calcium hydroxide employed therein. Substantially equivalent results are obtained.

Cast a 0.002-inch film of this alkyd-like product on a clean coke steel tin plate and heat at 150° C. for 30 minutes. The resulting film is clear, hard, tough and glossy, and does not crack on aging. The film is not attacked by xylol, ethanol, or 10% caustic solutions.

The products of this invention are reaction products of drying or semidrying oils with vinyl benzyl alcohol, and optionally, a styrene monomer.

Any drying or semidrying oil may be used to prepare the products of this invention. Illustrative of the drying oils are tung, oiticia, dehydrated castor, perilla, linseed, cashew nut shell, poppyseed, etc., oils. Illustrative of the semidrying oils are soyabean, cottonseed, sesame, rapeseed, safflower, corn, etc., oils. Particularly good results are obtained by using a mixture of a drying oil with a semidrying oil, and drying oil constituting at least 75% of the mixture.

Vinyl benzyl alcohol exists in three isomeric forms, i.e., the ortho-, meta-, and para-isomers. Any of these perform equally in the practice of this invention. However, mixtures of these isomers, in any combination, may be used, and are, in fact, preferred because of their ready commercial availability at relatively low cost. Generally, the use of from about 5 to 300 parts by weight of vinyl benzyl alcohol per 100 parts by weight of the drying or semi-drying oil will provide satisfactory results, depending upon the application intended. The lower vinyl benzyl alcohol contents will provide, e.g., weather-resistant oil paints, etc., whereas the higher vinyl benzyl alcohol contents will provide highly desirable, e.g., baking enamels, etc. Vinyl benzyl alcohol contents of from about 25 to 100 parts by weight per 100 parts by weight of oil are especially preferred in that a balance of the desirable properties of both the oil and the vinyl benzyl alcohol is obtained.

In certain instances, such as when using a highly unsaturated oil, it becomes preferable to employ a styrene monomer in conjunction with the vinyl benzyl alcohol. In such instances, the styrene monomer employed may be styrene itself or a methyl styrene. Included in the methyl styrenes are alpha methyl styrene, ortho methyl styrene, meta methyl styrene, para methyl styrene, ortho para dimethyl styrene, alpha para dimethyl styrene, etc.

When both vinyl benzyl alcohol and a styrene monomer are employed, the combined weight thereof should be in the aforesaid range of from about 5 to 300 parts per 100 parts by weight of the oil. In such instances, the ratio of the styrene monomer to vinyl benzyl alcohol may vary on a weight basis between about 1:19 and 19:1 depending upon the properties sought in the final products. Generally, the higher the vinyl benzyl alcohol content, the harder and more solvent and alkali resistant will the film be.

The reaction is effected at temperatures of from about 100 to 250° C. Unlike the preparation of styrenated oils which involves an addition reaction akin to a graft polymerization, the reaction of vinyl benzyl alcohol with drying or semidrying oils involves both an addition, i.e., graft-like, reaction and a trans-esterification reaction whereby the acid moiety of the oil transfers to and esterifies with the hydroxyl groups of the polymerizing vinyl benzyl alcohol. As a result, the entire resin structure is altered since the acid moiety of the oil is found not only to be grafted to the polymer chain through pendant hydroxyl groups, but actually enters to some small degree, albeit minor in many instances, into the backbone of the polymer through its allylic unsaturation. This is as opposed to prior art teaching coreaction of other vinyl monomers with drying oils whereby the oil serves only to terminate the polymeric chain. It is this transesterification reaction which is believed to account for the high rate of drying and the compatibility with melamine of these coating compositions. The glycerides formed during the transesterification reaction have unexpectedly been found to be fully compatible with the curved polymer and actually aid in the resistance of the film to cracking on aging.

While the reaction of the vinyl benzyl alcohol with the oil proceeds without need of catalyst, shorter reaction times are obtained through the use of a conventional peroxide-type initiator such as e.g., ditertiarybutyl peroxide, etc., to speed the addition reaction. A base is used to effect the transesterification reaction. The base may be any alkali metal hydroxide or any oxide or hydroxide of an alkaline earth metal or of lead. Exemplary of such bases are sodium hydroxide, potassium hydroxide, calcium oxide, calcium hydroxide, magnesium hydroxide, barium oxide, barium hydroxide, lead oxide, etc. Mixtures thereof may also be used. Either or both of the catalyst and the base may be used in amounts of up to about 5% each based upon the combined weight of the oil, the vinyl benzyl alcohol, and the styrene monomer, if such is employed.

Though no solvent is required, the reaction may be carried out in an inert solvent, preferably one which is acceptable as a component of a paint or varnish. Aromatic hydrocarbons such as toluene or xylene are preferred although mixtures thereof with minor amounts of aliphatic hydrocarbons such as hexane, solvent naphthas, etc., may be used. The amount of solvent should be from about 80 to 200 parts per 100 parts by weight of the combined oil, vinyl benzyl alcohol, and styrene monomer, if such is employed.

The coating compositions of this invention are useful as varnishes, paints and baking enamels per se and when modified with conventional paint materials such as natural and synthetic resins, fillers, pigments, colors, etc. A particularly valuable coating composition is made by incorporating in the reaction product up to 25% by weight of a melamine-formaldehyde resin, an ether thereof or a modification thereof with toluene sulfonamide.

EXAMPLE IV

A clear coating composition is prepared by mixing 80 parts of the alkyd-like product obtained in Example I with 20 parts of a 60% solids solution of melamine resin A in a mixture of xylene and butanol. No evidence of incompatibility (development of haze) appears on mixing. Cast a 0.006-inch film on a clean glass plate and heat at 120° C. for 30 minutes. The cured film is clear, tough, hard and substantially colorless, and does not crack on weathering. The film is not attacked by xylol, ethanol, or 10% caustic solutions.

Melamine resin A is prepared by reacting together 100 parts of melamine, 457 parts of Formalin (37% formaldehyde) and 43 parts of para-toluene sulfonamide under reflux at a pH of 8–9 followed by further reaction with 500 parts of butanol. The product is a butanol solution of a butylated co-condensation product of melamine, formaldehyde, and paratoluene sulfonamide. For purposes of Example III it is cut with xylol to a solids content of about 60% by weight.

EXAMPLE V

Example IV is repeated, substituting the alkyd-like product of Example II for that of Example I. Substantially equivalent results are obtained.

The drying time of the coating compositions of this invention can be shortened by the addition of conventional driers such as the cobalt and lead naphthanates. Pigments, fillers and other conventional paint additives are easily incorporated in the reaction products.

It is apparent that many variations may be made in the products and processes of this invention without departing from the spirit and scope thereof.

What is claimed is:

1. The polymeric product obtained by reacting 100 parts by weight of an oil with from about 5 to 300 parts by weight of vinyl benzyl alcohol at a temperature of from about 100 to 250° C., in the presence of up to 5% by weight, based upon the total weight of monomer and oil, of a base selected from the class consisting of alkali metal hydroxides and the oxides and hydroxides of (a) alkaline earth metals and (b) lead; said oil being selected from the group consisting of natural drying oils, natural semi-drying oils, and mixtures thereof.

2. A coating composition comprising a solution in an inert organic solvent of the product of claim 1.

3. A coating composition comprising a solution in an inert organic solvent of a melamine-formaldehyde resin and the product of claim 1.

4. A coating composition as in claim 3 wherein the melamine-formaldehyde resin is a cocondensation product of melamine, formaldehydes, paratoluene sulfonamide and butanol.

5. The polymeric product obtained by reacting, at a temperature of from about 110 to 250° C., 100 parts by weight of an oil with from about 5 to 300 total parts by weight of (a) vinyl benzyl alcohol and (b) a styrene monomer, the ratio of the styrene monomer to vinyl benzyl alcohol varying between 1:19 and 19:1 on a weight basis in the presence of up to 5% by weight, based upon the total weight monomer and oil, of a base selected from the class consisting of alkali metal hydroxides and the oxides and hydroxides of (a) alkaline earth metals and (b) lead; said oil being selected from the group consisting of natural drying oils, natural semi-drying oils, and mixtures thereof; said styrene monomer being selected from the group consisting of styrene, methyl styrenes, and mixtures thereof.

6. A product as in claim 5 wherein the styrene monomer is styrene.

7. A coating composition comprising a solution in an inert organic solvent of the product of claim 5.

8. A coating composition comprising a solution in an inert organic solvent of a melamine-formaldehyde resin and the product of claim 5.

9. A coating composition as in claim 8 wherein the melamine-formaldehyde resin is a cocondensation product of melamine, formaldehyde, paratoluene sulfonamide and butanol.

10. A process for preparing a reaction product of an oil and vinyl benzyl alcohol which comprises heating at from about 100 to 250° C. a mixture of 100 parts by weight of an oil and from about 5 to 300 parts by weight of vinyl benzyl alcohol; in the presence of up to 5% by weight, based upon the total weight of monomer and oil, of a base selected from the class consisting of alkali metal hydroxides and the oxides and hydroxides of (a) alkaline earth metals and (b) lead; said oil being selected from the group consisting of natural drying oils, natural semi-drying oils, and mixtures thereof.

11. A process for preparing a reaction product of an oil, vinyl benzyl alcohol and a styrene monomer which comprises heating at from about 100 to 250° C. a mixture of 100 parts by weight of an oil and from about 5 to 300 total parts by weight of (a) vinyl benzyl alcohol and (b) a styrene monomer, the ratio of the styrene monomer to vinyl benzyl alcohol varying between 1:19 and 19:1 on a weight basis; in the presence of up to 5% by weight, based upon the total weight of monomer and oil, of a base selected from the class consisting of alkali metal hydroxides and the oxides and hydroxides of (a) alkaline earth metals and (b) lead; said oil being selected from the group consisting of natural drying oils, natural semi-drying oils, and mixtures thereof; said styrene monomer being selected from the group consisting of styrene, methyl styrenes, and mixtures thereof.

12. A process as in claim 11 wherein the styrene monomer is styrene.

References Cited

UNITED STATES PATENTS

| | | | |
|---|---|---|---|
| 1,975,959 | 10/1934 | Lawson et al. | 260—23 |
| 2,534,193 | 12/1950 | Emerson | 260—87.3 |
| 2,647,876 | 8/1953 | Evans et al. | 260—23 |
| 3,069,399 | 12/1962 | Abramo et al. | 260—80.5 |
| 3,133,032 | 5/1964 | Jen et al. | 260—21 |

FOREIGN PATENTS 581,897  10/1946  Great Britain.

DONALD E. CZAJA, *Primary Examiner.*

R. W. GRIFFIN, *Assistant Examiner.*

U.S. Cl. X.R.

260—23, 33.4, 33.6, 41; 117—124, 134, 167